June 4, 1957 W. L. HART 2,794,350
PLANETARY GEAR SET WITH OVERLOAD RELEASE
Filed July 31, 1951 3 Sheets-Sheet 1
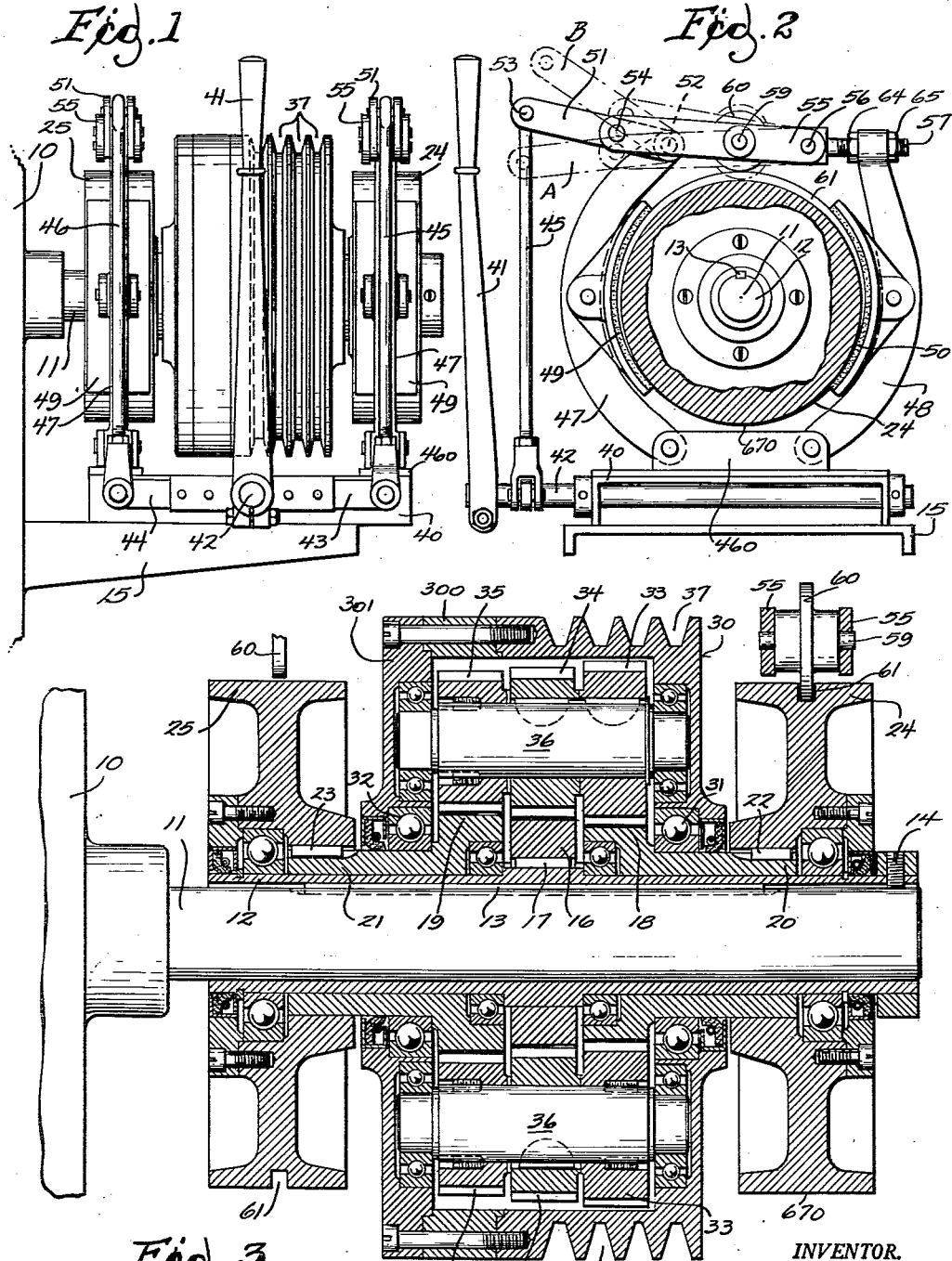
INVENTOR.
WALTER L. HART
BY
Wheeler, Wheeler & Wheeler
ATTORNEYS

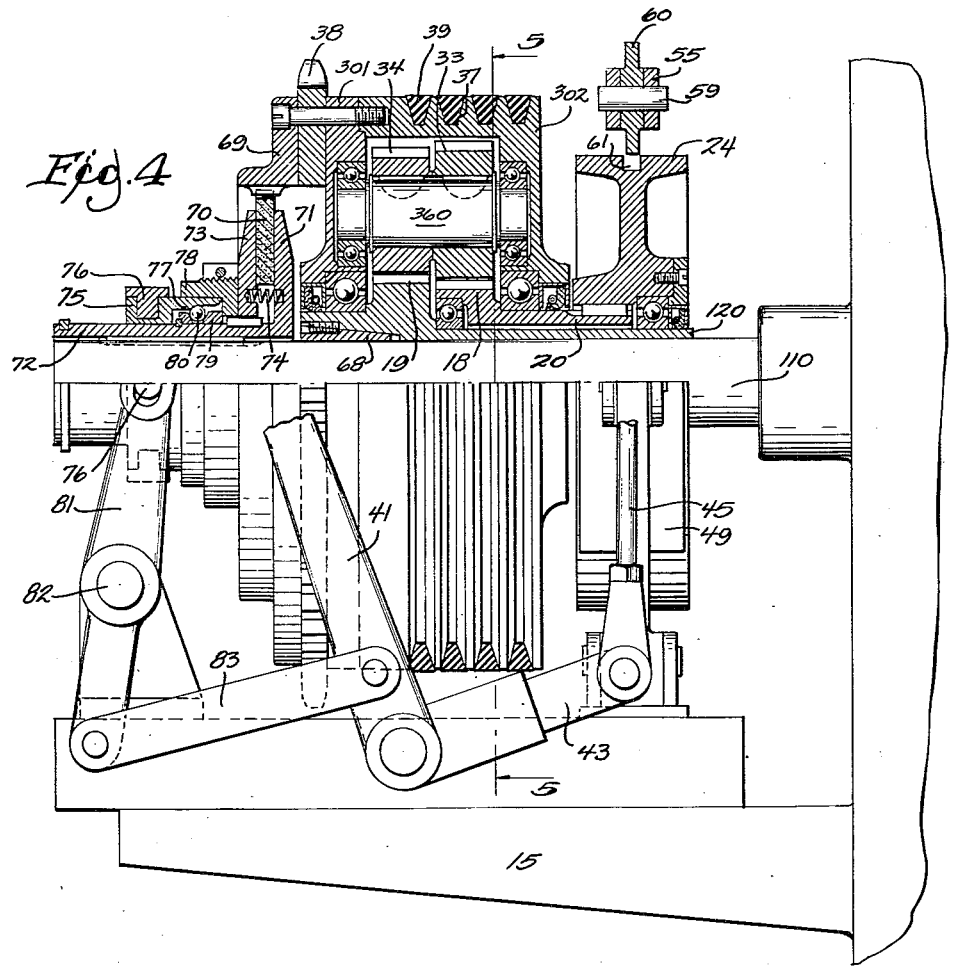
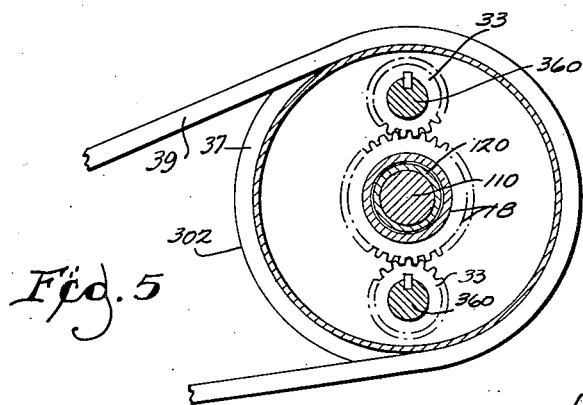

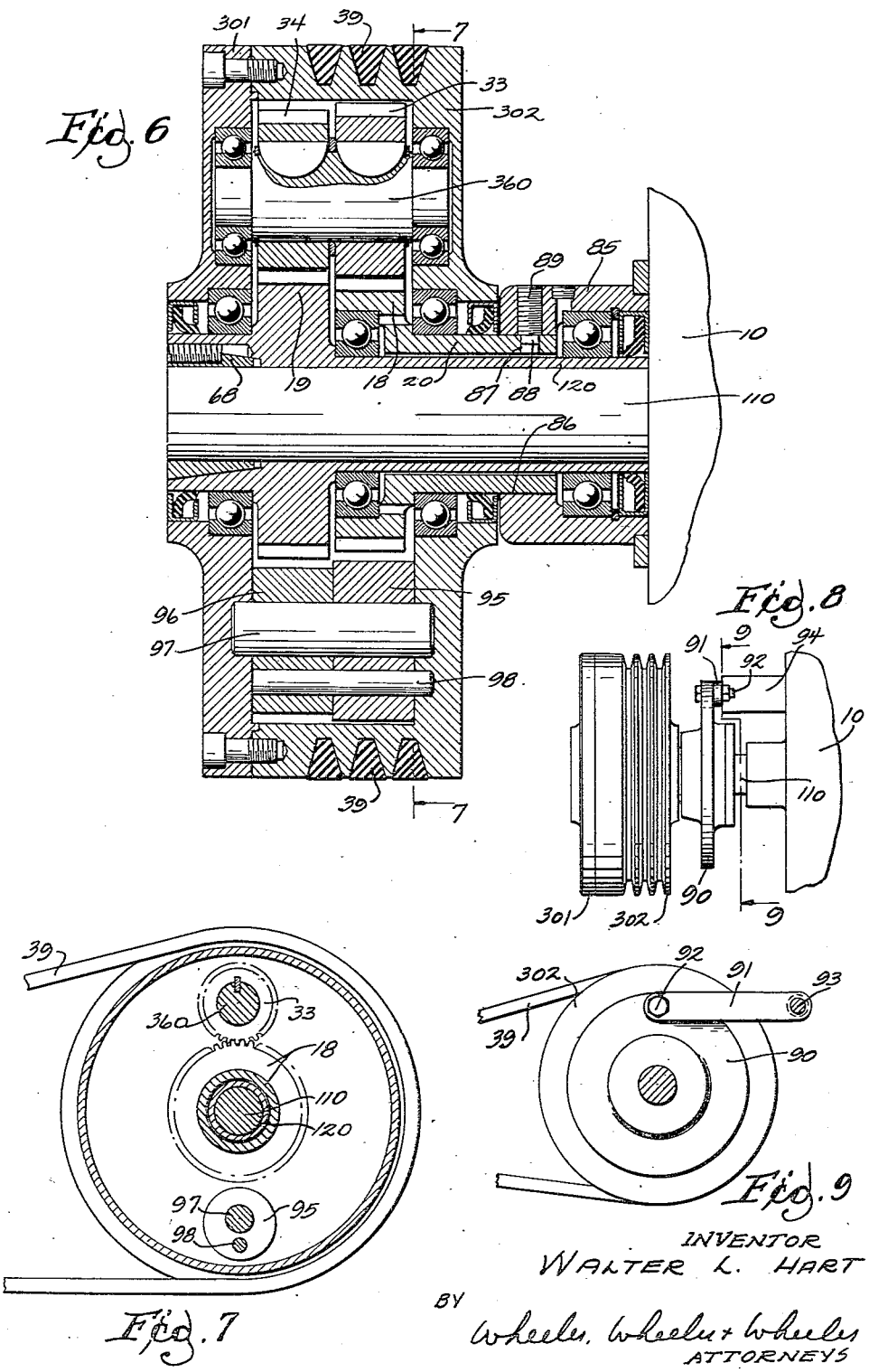

United States Patent Office 2,794,350
Patented June 4, 1957

2,794,350
PLANETARY GEAR SET WITH OVERLOAD RELEASE

Walter L. Hart, Milwaukee, Wis.

Application July 31, 1951, Serial No. 239,509

16 Claims. (Cl. 74—766)

This invention relates to a planetary gear set with overload release.

The device is desirably incorporated in a driving pulley or sprocket which is mounted on a shaft to which motion is to be transmitted at reduced speed in forward or reverse. That gear of the planetary transmission which is fixed during motion transmission to the driven shaft is desirably controlled by a brake which is adjustable as to tension and which is applied by toggle linkage provided with a cam follower in the path of rotation of a cam or eccentric connected with the brake drum so that in the event of slippage, due to overload, the cam will engage the follower to throw out the toggle linkage and thereby release the brake and disengage the transmission.

One embodiment of the invention includes a pair of such brakes so associated with a dual transmission that the driven shaft may be driven at reduced speeds, either of which, according to gear design, may be either forward or reverse, the overload release feature being desirably present in each drive. Another embodiment of the invention includes a supplemental clutch whereby the driven shaft may be operated either in direct drive at full pulley speed, or through the transmission at a reduced speed. Alternative devices substitute permanent anchorages for the brake and also substitute counterbalancing means for some of the gears of the planetary transmission.

In the drawings:

Fig. 1 is a view in side elevation of a driving pulley incorporating a dual planetary gear set, and provided with a single control lever for making either speed available at the driven shaft.

Fig. 2 is a view of the device of Fig. 1 as it appears in end elevation, portions of the mechanism being broken away to show the relationship between the brake drum and the eccentric and the overload throwout.

Fig. 3 is an enlarged view in axial section through the dual planetary transmission of Fig. 1.

Fig. 4 is a view partially in axial section and partially in side elevation showing a modified embodiment of the invention.

Fig. 5 is a detail view taken on line 5—5 of Fig. 4 on a reduced scale.

Fig. 6 is a view in axial section through a further modified embodiment of the invention.

Fig. 7 is a detail view on a reduced scale taken on line 7—7 of Fig. 6.

Fig. 8 is a view in side elevation showing a further modified embodiment of the invention.

Fig. 9 is a view taken in section on the line 9—9 of Fig. 8.

At 10 in Figs. 1 and 3, there is represented a machine having a shaft 11 to be driven. Aside from the control mechanism, the entire planetary transmission is carried unitarily on a sleeve 12 connected by a key 13 to shaft 11 and anchored by a set screw 14. Control mechanism of the type shown in Figs. 1 to 4 is mounted on the bracket 15 connected with the machine.

Fixed in a substantially centered position on the mounting sleeve 12 is a gear 16 held against rotation relative to sleeve 12 by a key 17. At opposite sides of gear 16 are the gears 18 and 19 which are rotatable on sleeve 12 and have their hubs 20 and 21 respectively extended in opposite directions along the sleeve to receive connection by means of keys 22 and 23 with the respective brake drums 24 and 25.

The planetary gear housing 30 is rotatably supported by the ball bearings 31, 32 from the hubs 20 and 21 of gears 18 and 19 to enclose the three gears 16, 18 and 19 and the pinions 33, 34 and 35 respectively meshing therewith. These pinions are mounted in sets on shafts 36 which are rotatable in the housing and to which all of the pinions of a given set are keyed to rotate in unison. The housing 30 comprises the driving element of the planetary transmission and is either provided with belt-receiving grooves as at 37 in Figs. 1 to 4, or with driving sprocket or other teeth as at 38 in Fig. 4. The source of power will usually be a motor (not shown) which drives the housing pulley 30, as by means of a belt 39 (Figs. 5 and 7).

Assuming that both of the brake drums 24 and 25 are free, the application of power to the driving element 30 of the transmission will be ineffective to rotate shaft 11, since the planetary movement of pinion 35 about the driven gear 18 or 19 will simply cause the drums 24 and 25 to rotate idly at different speeds and directions.

It will be understood that in planetary transmissions of this type the design may be such as to provide for any reduction of speed within a wide range, and the driven shaft may be made to rotate in either direction. The specific device exemplifying the invention in Figs. 1 to 3 provides for drive at a reduced rate in one direction while one of the brake drums is held stationary and for drive at a reduced rate in the opposite direction when the other drum is held stationary. If the pitch diameter of the held gear is greater than the pitch diameter of the output gear, the output gear and the driven shaft will go in the opposite direction from that of the pulley. If the pitch diameter of the held gear is less than the pitch diameter of the output gear, the output gear and the driven shaft will go in the same direction as the pulley. Thus, if the gear 18 is the held gear, as the result of braking pressure on the drum 24, the output gear 16 of the driven shaft 11 will turn in the same direction as pulley 30; whereas, if the gear 19 is the held gear, as the result of braking pressure applied to drum 25, the output gear 16 and driven shaft 11 will turn in the opposite direction from pulley 30. The ratio of reduction will obviously depend on the particular ratios of the gears used in that portion of the set which is operative.

As a means of applying braking pressure to one or the other of the drums, but not to both, and also providing for the automatic release of braking pressure in the event of overload, I provide a dual brake set which is mounted on sub-frame 40. The control lever 41 is fixed to a rock shaft 42 which has radially projecting arms at 43, 44 to which the links 45 and 46 are pivoted.

Also mounted on the sub-frame 40 is the base 460 to which are pivoted brake levers 47 and 48 carrying the brake shoes 49, 50, respectively. The lever 47 is connected by a pair of links 51 with applicator link 45, links 51 being pivoted at 52 to the lever 47 and at 53 to link 45. Connected by pintle 54 to links 51, intermediate the ends thereof, is a pair of links 55 pivotally connected by pintle 56 with a bolt 57 adjustable through the end of lever 48. The links 51 and 55 together constitute a toggle linkage which, when the rock shaft 42 is rocked clockwise from the position of Fig. 1, serves to draw the free ends of brake levers 47 and 48 together, with a resulting pressure application of the brake shoes 49 and 50 to the brake drum 24. This action results from the movement of pintle 54 toward or beyond a self-sustaining position on a line drawn through pintles 52 and 56, the final position of the linkage being shown by dotted line A in Fig. 2. (The dotted line position B is the position of this linkage when drum 25 is engaged by its brakes due to oscillation of control lever 41 to the left from its Fig. 1 position.)

A movement of the control lever 41 back to or beyond the neutral position in which it is shown in Fig. 1 will raise link 45 to the full line position of Fig. 2, thereby releasing the tension across the toggle linkage 51, 55, and releasing the braking action of the shoes 49 and 50 on drum 24.

The links 55 are spanned intermediate their ends by a pin 59 upon which the cam follower roller 60 is journaled. Connected with the drum 24 is a cam or eccentric cooperating with the roller 60. In the preferred exemplification shown, the cam or eccentric is integral with drum 24, being formed by cutting eccentrically into the periphery of drum 24 a groove 61 which is sufficiently deep at one side of the periphery of drum 24 to receive the cam follower roller 60 bodily, without contact. At the other side of the drum 24, the groove 67 runs out completely, as shown at 670 in Fig. 3. The diameter of the roller 60 is such that when the brake is applied, the roller 60 is moved toward the axis of the driven shaft 11 to a point which is less than the radius of drum 24, thereby requiring the cam follower 60 to enter groove 67. In the event of overload sufficient to cause the drum to slip respecting the brake shoes 49 and 50, the first 180° of slippage will register the ungrooved peripheral portion 670 of the drum with the roller, thereby lifting the roller to force link 55 and link 51 upwardly, thereby releasing the brake and relieving the driven shaft 11 of the driving action of the planetary transmission.

The braking mechanism and brake releasing mechanism associated with the brake drum 25 are identical with that already described and have been given like reference characters. The lever 41, in its neutral position, applies little or no braking pressure to either drum. If moved clockwise from the neutral position of Fig. 1, the control lever applies the brake to drum 24 and further withdraws the brake shoes 49 and 50 from drum 25. If the shoes are engaged with drum 24, the shaft 11 rotates in the same direction as the pulley.

If the control lever is moved counterclockwise from the position of Fig. 1, the brake shoes 49 and 50 are further withdrawn from drum 24 and the corresponding shoes are applied to drum 25. In the latter event, the rotation of the driven shaft 11 is in reverse in respect to that of pulley 30. If both sets of brake shoes are released, as in the Fig. 1 position of the control handle 41, the planetary mechanism idles and no motion is communicated to shaft 11.

The pressure developed when the brake is applied can be controlled by adjusting the bolt 57 with respect to brake lever 48. This is done by releasing one of the nuts 64 and tightening the other nut 65 on bolt 57, thereby reducing the spacing between the free ends of the levers 47 and 48. The contrary adjustment of the nuts will relax the braking pressure. It will be understood that it is impossible to apply the brake at the moment when the high point 670 of the cam or eccentric registers with the cam follower roller 60. However, as the drum rotates idly beneath the roller 60, the continued manual pressure on the handle 41 will, within 180° of rotation, urge the roller into the deep part of the groove 61 and simultaneously apply the brake to bring the drum to rest.

The device of Fig. 4 is identical with that above described except that it has but one reduced speed which, as shown, is a forward speed. Reference to Fig. 3 will disclose that the housing 30 comprises a removable ring 300 and a removable end closure 301. The ring 300 elongates the housing in an axial direction just sufficient to receive the extra set of gears 19 and 35. In the Fig. 4 construction, the housing 302 comprises the identical main section and the identical end closure 301, omitting the ring 300, and using a shorter shaft at 360 of just sufficient length to accommodate the gears 33 and 34. The gear 18 is disposed on a relatively shorter mounting sleeve 120, but is otherwise identical to that shown in Fig. 3. The brake drum 24 is mounted and operated in the same manner as above described and the controls are likewise identical. However, the gear 19 is here connected directly with the driven shaft 110 by means of key 68 and a separate means is employed for clutching the combined pulley and planetary gear housing 302 directly to shaft 110 when desired.

For this purpose, the hub 69 of sprocket 38 (this sprocket being bolted to housing 302) is provided internally with an annular clutch disk at 70 confined between the flange 71 of mounting sleeve 72 and the flange 73 which is axially reciprocable on the hub 72. A compression spring at 74 confined between flanges 71 and 73 tends to urge flange 73 to the left as viewed in Fig. 4, thereby releasing the intermediate clutch annulus 70. A shifting collar 75 grooved to receive the shifting fork 76 has a ball race extension 77 within the collar 78 carried by flange 73. The opposing race 79 constitutes another collar which is slidable on hub 72 and abuts collar 78. Between the races 77 and 79 are confined the ball bearings 80 which transmit axial motion from the shifting fork 76 to the flange 73 to develop pressure of this flange toward flange 71 upon the intervening clutch disk 70. Since the flanges 71 and 73 are keyed to each other and to the driven shaft 110, it will be apparent that the pressure engagement of the flanges with the clutch disk 70 will provide a driving coupling from the housing 302 directly to the driven shaft. Clutch disk 70 is splined to hub 69 to float axially thereof for self-adjustment between flanges 71 and 73. The shifting fork 76 is mounted on a lever 81 fulcrumed at 82 and connected by link 83 with the control lever 41 to operate alternately with the braking of drum 24 as above described.

While Fig. 5 shows a cross section through the device of Fig. 4, it would also apply as a corresponding cross section through the device of Figs. 1 to 3, being typical of the planetary arrangement.

If the transmission is to serve only the function of a speed reducer, without any requirement for declutching the driven shaft 11 or 110, the arrangement may be as shown in Figs. 6 to 9, wherein two different means of permanently fixing the hub portion 20 of gear 18 are illustrated. In the device of Fig. 6, a ring 85 which is made fast to the frame of the machine 10 has a bearing for the sleeve 120 and is socketed at 86 to receive the hub 20 of the sun gear 18. A hole at 87 in the hub receives a pin 88 on a bolt 89 fitted into the fixed collar 85 to anchor the sun gear.

In the device of Figs. 8 and 9, a floating collar 90 takes the place of the collar 85, being connected with the hub 20 in the same manner shown in Fig. 6 and being fixed against rotation by means of a link 91 attached by cap screw 92 to the collar 90 and by means of bolt 93 to a fixed stud 94 on the machine.

Where facilities for the accurate machining of the gears are available, it is preferred that the planetary gears be arranged in symmetrically balanced sets, as in Fig. 5. In other words, the respective planetary gears are at equal angular spacing, regardless of their number.

Where the gears cannot be machined with perfect accuracy, so as to function smoothly in multiple, and where the tooth loading is light in any event, it is possible to make a very satisfactory planetary transmission using only a single planetary gear in mesh with each of the sun gears. This is shown in Fig. 7 and is illustrated as an incidental feature of Fig. 6, it being understood that this particular feature may be used in any one of the transmissions and is not limited to a device having the other details of Fig. 6.

Where there is but a single active planetary gear in mesh with each sun gear, the weight thereof, which would otherwise be eccentrically unbalanced, is counterbalanced by a dummy 95 which is diametrically opposite planetary pinion 33, and a similar dummy 96 which serves as a counterweight for balancing the other planetary pinion 34 as shown in Fig. 6. The two counterweights 95 and 96 are mounted on a cross pin 97 and may be secured against rotation, if desired, by another cross pin 98. The two cross pins 97, 98 substantially equal in mass the shaft 360 on which the active pinions are rotatable; and the counterweights 95 and 96 are respectively substantially equal in mass in the pinions 33 and 34. Thus the device is in balance in every respect, notwithstanding that it has only a single pair of planetary pinions.

I claim:

1. In a planetary transmission comprising driving and driven rotors and a planetary gear train provided with a third rotor having a brake element, said gear train being effective for motion transmission between the driving and driven rotors only when the motion of said third rotor is arrested, the combination therewith of means for braking said element, said braking means being of limited effect, whereby said element and third rotor are rotatable notwithstanding said braking means when the torque to which said planetary gearing is subject exceeds a predetermined value, a tripping device including a part connected with said element and another part in the path of movement thereof to be engaged by the first part when said element yields in response to excessive torque on said gearing, and brake releasing means connected with the second part to be actuated thereby when the second part is engaged by the first part, thereby releasing said braking means to discontinue motion transmission through said gearing.

2. The device of claim 1 in which the said braking element comprises a drum and the braking means comprises a brake shoe and a lever and link, the said parts respectively comprising a cam and cam follower connected with the drum and link respectively.

3. In a transmission comprising a driven rotor, a driving rotor, a planetary gear set operatively connecting said rotors and including a third rotor provided with a brake drum, the combination therewith of a brake lever provided with a shoe engageable with the drum, brake applying means comprising toggle linkage connected with said lever, and a cam and cam follower respectively connected with the toggle linkage and drum and engageable upon the rotation of said drum for breaking said toggle linkage in a direction to disengage said shoe.

4. The device of claim 3 including adjustable connection of the toggle linkage and said lever, whereby the engagement of said shoe with said drum may be varied to predetermine the load at which the drum will rotate to break said toggle linkage and release the shoe.

5. In a transmission having driving and driven rotors and a set of planetary gearing operatively connecting the rotors and provided with a third rotor having a brake drum which must be retarded as to its rotation to render said transmission operative, the combination with said drum of a brake shoe engageable with the drum for resisting rotation thereof, a lever upon which the shoe is mounted, an actuating lever, and a pair of toggle links connected with the respective levers, one of said toggle links being movable across center in a direction to engage the shoe with the drum and to render said toggle linkage stable, the drum being provided with a cam and one of said toggle links being provided with a cam follower disposed in the path of rotation of said cam to be displaced in a direction to dislodge the toggle links from said stable position in the event of drum slippage, whereby substantially completely to release said brake shoe upon the occurrence of drum slippage.

6. The device of claim 5 in which the cam comprises an eccentric surface directly upon the drum.

7. The device of claim 5 in which the said surface includes a channel cut into the periphery of the drum, the cam follower comprising a roller mounted upon one of said links.

8. In a transmission the combination with a driving rotor and a driven quill, the rotor comprising a housing, of a planetary gear set comprising a sun gear fixed to the quill, a second sun gear having a mounting sleeve fixed thereto and extending axially from said housing and planetary pinions rotatably mounted in the housing and connected with each other and meshing with the respective sun gears, a braking element connected with said sleeve externally of the housing, brake means acting thereon, means including a lever for actuating said braking means to and from operative positions respecting said element, and cam and cam follower parts respectively connected with said element and lever and engageable in the rotation of said element with said sleeve for displacing the lever in brake releasing direction whereby to render the planetary transmission ineffective for the transmission of motion from the housing to said quill.

9. The device of claim 8 in which the lever comprises a link of a toggle link set which is self-locking in the operative position of said braking means and releasable upon engagement of the cam and cam follower.

10. The device of claim 9 in which the braking element comprises a drum and the braking means a shoe provided with a lever with which the toggle link set is adjustably connected, the cam comprising a surface integral with said drum and the follower comprising a roller connected with said link.

11. In a transmission, the combination with a driven quill constituting a mounting sleeve and having a sun gear fixed therefrom at an intermediate point, a pair of sleeves rotatably mounted upon said quill at opposite sides of the sun gear and carrying second and third sun gears respectively, a housing comprising a driving element of the transmission and having hub portions rotatably mounted for rotation about said sleeves, at least one pinion set rotatably mounted in the housing and comprising pinions in motion transmitting connection with each other and in mesh with said first, second and third sun gears, braking elements connected with the respective sleeves, braking means selectively engageable with respective elements, and a single control connected with said braking means for the selective engagement thereof with respective elements whereby to render the second and third sun gears alternatively stationary to effect motion transmission from said housing to said quill through selected pinions, said single control comprising a lever having oppositely projecting arms, links connected with respective arms for movement in opposite directions, brake shoes movable to and from engagement with respective elements and motion transmitting connections from said links to the respective shoes, said shoes being mounted on levers and the said links each comprising toggle link assembly movable across center to a self-sustaining position in the movement of its respective brake shoe lever toward a position for brake shoe engagement, each of said elements being provided with a brake releasing cam and each of said toggle linkages being provided with a cam follower in the path of cam rotation with the respective element for effecting complete breakage of the toggle linkage from its stable position to a brake shoe releasing position in the event of slippage of said element with reference to its respective shoe.

12. A transmission comprising the combination with a mounting sleeve centrally provided with a sun gear and second and third sleeves respectively rotatable on the first sleeve at opposite sides of the sun gear and respectively provided with second and third sun gears, a housing having a hub portion rotatably mounted coaxially with the second and third sleeves, at least one set of planetary pinions rotatably mounted within the housing and in connection with each other and comprising pinions meshing with the first, second and third sun gears respectively, brake drums mounted on the second and third sleeves externally of the housing, brake shoes movable to and from engagement with the respective drums, brake levers upon which the shoes are mounted for such movement, a control lever mounted for oscillation on an axis transverse with respect to said first sleeve and provided with oppositely projecting arms and linkage means connecting the respective arms with the respective brake levers to actuate said levers in opposition to and from shoe engaging position, said linkage means comprising toggle links movable across center to self-sustaining positions in the movement of their respective brake levers toward shoe engaging position, and movable from self-sustaining position in the release of said shoes.

13. The device of claim 12 in further combination with overload release mechanism comprising cam follower means respectively connected with the respective drums and their respective toggle links, the cam follower means being positioned in the path of rotation of the cam means with their respective drums for the movement of the toggle links from self-sustaining position in the event of drum rotation with respect to a shoe engaged therewith, whereby to release the drum last mentioned and to render said planetary transmission inoperative in the event of overload.

14. The device of claim 12 in further combination with an adjustable connection between the brake lever and its toggle link.

15. In a device of the character described, an overload brake releasing device comprising in combination a brake drum eccentrically provided with a cam, a brake lever provided with a shoe engageable with the drum and a lever operating link having a cam follower which, in the movement of the link to engage the shoe with the drum, is movable to a position in the path of the cam, slippage of the drum respecting the shoe being adapted to engage the cam with the cam follower to urge said link into brake releasing position.

16. In a device of the character described, a brake mechanism self-releasing upon overload and comprising a drum, a pair of opposing brake levers, shoes connected with the respective levers for movement into engagement with the drum, and lever actuating means comprising a pair of toggle links connected with the respective brake levers and movable across center to engage the shoe with the drum, whereby to be substantially self-sustaining until released, the said drum and one of said links being respectively provided with cam and cam follower means engageable in the rotation of the drum in a direction to effect the release of said toggle links from self-sustaining position and the consequent release of said shoes from drum engagement.

References Cited in the file of this patent

UNITED STATES PATENTS

| | | |
|---|---|---|
| 361,222 | Jones et al. | Apr. 12, 1887 |
| 588,356 | Rogers | Aug. 17, 1897 |
| 626,445 | Smith | June 6, 1899 |
| 951,146 | Paris | Mar. 8, 1910 |
| 1,179,040 | Rockstroh | Apr. 11, 1916 |
| 1,225,487 | Potter | May 8, 1917 |
| 1,263,290 | Sanderson | Apr. 16, 1918 |
| 1,319,367 | Weidely | Oct. 21, 1919 |
| 1,465,796 | Twomley | Aug. 21, 1923 |
| 1,708,329 | Roberts | Apr. 9, 1929 |
| 1,788,602 | Sutton | Jan. 13, 1931 |
| 1,817,307 | Haase et al. | Aug. 4, 1931 |
| 1,905,952 | Scott | Apr. 25, 1933 |
| 2,006,172 | Klappauf | June 25, 1935 |
| 2,132,951 | Hall | Oct. 11, 1938 |
| 2,230,338 | Shaw | Feb. 4, 1941 |
| 2,277,554 | McCoy | Mar. 24, 1942 |
| 2,413,763 | Heyer | Jan. 7, 1947 |
| 2,554,330 | Hodgson | May 22, 1951 |
| 2,612,786 | Schmitter | Oct. 7, 1952 |
| 2,623,406 | Hansen | Dec. 30, 1952 |
| 2,668,459 | Berklege | Feb. 9, 1954 |

FOREIGN PATENTS

| | | |
|---|---|---|
| 344,145 | France | Oct. 25, 1904 |
| 19,701 | France | Feb. 17, 1915 |
| | (2nd addition to 445,275) | |
| 451,716 | France | Apr. 25, 1913 |
| 529,757 | France | Sept. 16, 1921 |
| 230,848 | Germany | Feb. 7, 1911 |
| 485,674 | Great Britain | May 26, 1938 |
| 263,101 | Switzerland | Nov. 1, 1949 |